United States Patent

Murakami et al.

[11] Patent Number: 4,990,986
[45] Date of Patent: Feb. 5, 1991

[54] SEMICONDUCTOR ACCELERATION SENSOR

[75] Inventors: Koichi Murakami, Yokosuka; Yukitsugu Hirota, Kamakura; Mikio Bessho; Masahiro Tsugai, both of Amagasaki, all of Japan

[73] Assignees: Nissan Motor Co., Ltd., Yokohama; Mitsubishi Denki Kabushiki Kaisha, Tokyo, both of Japan

[21] Appl. No.: 400,535

[22] Filed: Aug. 30, 1989

[30] Foreign Application Priority Data

Sep. 2, 1988 [JP] Japan .................. 63-218517

[51] Int. Cl.$^5$ .............. H01L 29/84; H01L 29/66; H01L 29/06
[52] U.S. Cl. ........................ 357/26; 357/25; 357/55
[58] Field of Search .................. 357/26, 55, 25

[56] References Cited

U.S. PATENT DOCUMENTS 4,345,477  8/1982  Johnson ................. 357/26
4,706,374  11/1987  Murakami ............... 357/26

FOREIGN PATENT DOCUMENTS 0100475  6/1985  Japan .................... 357/26

Primary Examiner—Rolf Hille
Assistant Examiner—Wael Fahmy
Attorney, Agent, or Firm—Foley & Lardner, Schwartz, Jeffery, Schwaab, Mack, Blumenthal & Evans

[57] ABSTRACT

A semiconductor acceleration sensor, including a semiconductor substrate, in which a mounting portion is formed in the substrate, and first and second cantilevered beams are formed in the substrate in opposite sides of the mounting portion so that these three members are aligned along a straight line, and in which a weight is formed at an end of the first cantilevered beam, and first and second strain sensing devices are formed in approximately the same layout in surface portions of the first and second cantilevered beams, respectively.

12 Claims, 4 Drawing Sheets

SEMICONDUCTOR ACCELERATION SENSOR

BACKGROUND OF THE INVENTION

1. Field of the Invention

The present invention relates to a semiconductor acceleration sensor having improved temperature characteristics.

2. Description of the Background Art

In FIGS. 1 and 2, there is shown a conventional semiconductor acceleration sensor which is fabricated by carrying out an etching process an N-type silicon substrate having a (100) surface, as disclosed in Japanese Patent Laid-Open Specification No. 62-213280. In semiconductor acceleration sensor prepared by etching the silicon substrate, a rectangular silicon center mass or weight 2 is arranged in the central portion of a frame 1 isolated therefrom, and a cantilevered beam 3 for detecting an acceleration couples the central left side portion of the silicon weight 2 to the frame 1. Another cantilevered beam 4 for a temperature compensation having no weight on its end is formed to the frame 1 near the cantilevered beam 3 in parallel therewith. The cantilevered beam 4 is so designed that the thickness and width are equal to those of the cantilevered beam 3. A pair of piezoresistors 5a is formed in the surface portion of the cantilevered beam 3 by doping a P-type impurity in the direction of the <110> crystal axis so as to extend in parallel with each other in the longitudinal direction of the cantilevered beam 3. A pair of piezoresistors 5b are formed in the surface portion of the cantilevered beam 4 in the same manner as those of the cantilevered beam 3. Usually, a protecting film composed of SiO2 is formed over the surface of the silicon substrate including the piezoresistors 5a and 5b.

The piezoresistors 5a and 5b are so connected to constitute a bridge structure shown in FIG. 2, and thus, in fact, the ends of the piezoresistors 5a and 5b are bonded to electrodes (not shown) composed of an aluminum film or the like in order to connect exterior devices via wirings.

Now, when acceleration is provided for the semiconductor acceleration sensor, as indicated by arrows in FIG. 1, the silicon weight 2 receives the force due to acceleration, and thus the cantilevered beam 3 for acceleration sensing is bent. Hence, a bending stress is applied to the piezoresistors 5a formed in the surface portion of the cantilevered beam 3, and their resistances are varied. At the same time, in turn, the force which the cantilevered beam 4 for temperature compensation receives due to acceleration is slight, and the cantilevered beam 4 is hardly bent. Consequently, a bending stress is hardly applied to the piezoresistors 5b, and their resistances are hardly changed.

Assuming that the resistance of each of piezoresistors 5a 5b is defined as R and the resistance variation of the piezoresistor 5a is $\Delta R$, the output voltage Vout of the bridge circuit shown in FIG. 2 is represented by the following formula.

$$\text{Vout} = (\tfrac{1}{4}) \cdot (\Delta R/R) \cdot V_B \qquad (1)$$

wherein $V_B$ is the voltage applied to the bridge circuit.

Further, consideration as to offset temperature characteristics is sufficiently provided in the semiconductor acceleration sensor described above. That is, the thermal stress caused by the difference of the thermal expansion coefficient between the silicon and the protecting film such as SiO2 formed thereon is different among the four piezoresistors 5a and 5b to cause an offset voltage. The influence due to the generation of the offset voltage can be prevented by using the two cantilevered beams 3 and 4 for acceleration sensing and temperature compensation. That is, these two cantilevered beams 3 and 4 are designed to equal conditions such as thickness and width except that the acceleration sensing cantilevered beam 3 has the silicon weight 2 on the end, and the piezoresistors 5a and 5b of the cantilevered beams 3 and 4 are also designed to equal conditions and layouts. Therefore, almost the same thermal stress caused by the difference of the thermal expansion coefficient between the protecting film such as SiO2 and the silicon is provided for the piezoresistors 5a and 5b, and thus the offset temperature characteristics are improved.

However, the conventional acceleration sensor has some problems. That is, firstly, since the two cantilevered beams 3 and 4 and weight 2 connected to the cantilevered beam 3 are formed within the frame 1 having a rectangular ring form with a space 6 therebetween, a complicated etching process is required.

Secondly, in addition to the thermal stress caused by the difference of the thermal expansion coefficient between the protecting film and the silicon, there is another main cause for reducing the offset temperature characteristics. That is, usually, the frame 1 is adhered to a mounting member, and the mounting member is attached to a package by using an adhesive to carry out a mounting of the sensor chip. There is another thermal stress caused by the difference of the thermal expansion coefficient among the silicon, the mounting member, the package and/or the adhesive. However, no consideration relating to the latter thermal stress is provided in the conventional acceleration sensor shown in FIG. 1, and hence thermal stresses of different strengths are applied to the piezoresistors. In particular, thermal stresses of different strengths are applied to the piezoresistors 5a and 5b for acceleration sensing and temperature compensation, with the result of reducing the offset temperature characteristics.

Thirdly, since the two cantilevered beams 3 and 4 are attached to a part of the inside side surface of the frame 1, stress concentrated areas or portions indicated by circles 7 are produced in the acceleration sensor to cause a weak structure for breakdown or destruction.

SUMMARY OF THE INVENTION

It is therefore an object of the present invention to provide a semiconductor acceleration sensor, free from the aforementioned defects and disadvantages of the prior art, which is capable of negating thermal stresses caused by a difference of thermal expansion coefficient among a mount member, a package, an adhesive and/or a semiconductor to improve offset temperature characteristics, and which is produced by a simple process and does not include any stress concentrated portion.

In accordance with one aspect of the present invention, there is provided a semiconductor acceleration sensor, comprising a semiconductor substrate, a mounting portion formed in the substrate, first and second cantilevered beams formed in the substrate in opposite sides of the mounting portion so that the mounting portion and the first and second cantilevered beams are aligned along a straight line, a weight formed at an end of the first cantilevered beam, and first and second strain sensing devices formed in approximately the same layout in surface portions of the first and second cantilevered beams, respectively.

DESCRIPTION OF THE PREFERRED EMBODIMENTS

Figure 1:
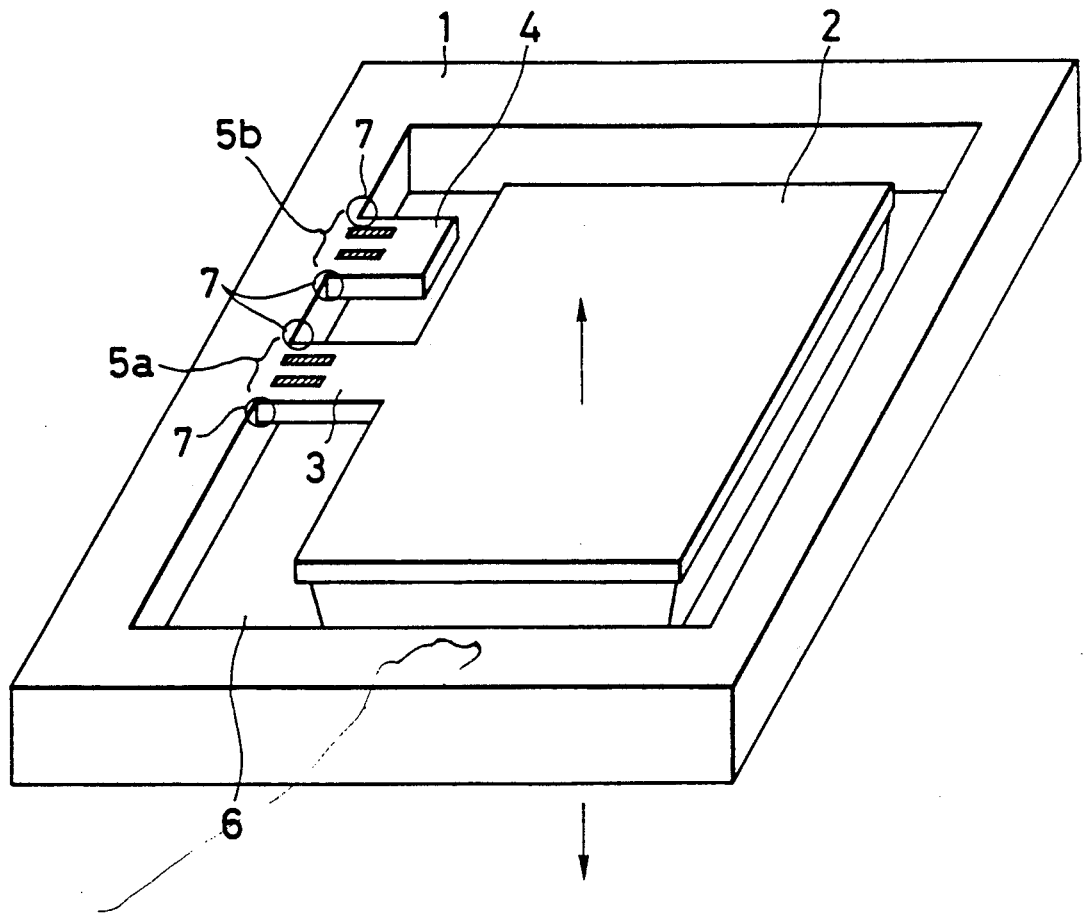
FIG. 1 is an enlarged perspective view of a conventional acceleration sensor.
Figure 2:
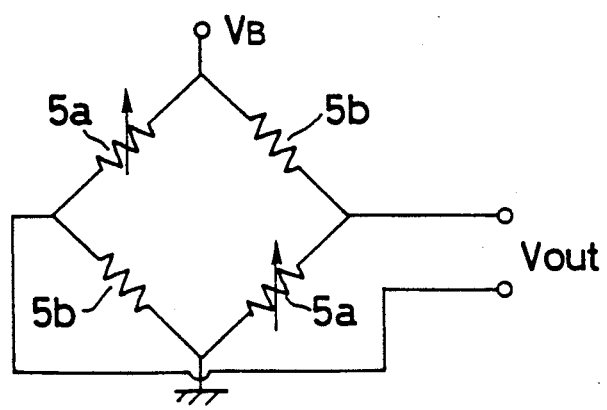
FIG. 2 is a circuit diagram of a bridge circuit composed of piezoresistors of the acceleration sensor shown in FIG. 1.

Referring now to the drawings, wherein like reference characters designate like or corresponding parts throughout the several views and thus the repeated description thereof can be omitted for the brevity, there is shown in FIGS. 3 to 6 a first embodiment of a semiconductor acceleration sensor according to the present invention.

In the drawings, first and second cantilevered beams 12 and 14 for acceleration sensing and temperature compensation, respectively, having equal thickness and width are formed opposite left and right sides of a mounting portion 11 by etching a silicon semiconductor substrate 20 so as to align these three members along a straight line. A surface protecting film 18 such as SiO$_2$ is formed on the surface of the silicon semiconductor substrate 20, hereinafter described in detail. A silicon weight 13 is formed at the end of the first cantilevered beam 12, and an upper weight 16 is adhered on the silicon weight 13 by using an adhesive layer 17 applied between the upper weight 16 and the protecting film 18 on the silicon weight 13. The silicon weight 13 and the upper weight 16 constitute a first weight. A second weight 15 having a smaller mass than that of the first weight is formed at the end of the second cantilevered beam 14.

Figure 3:
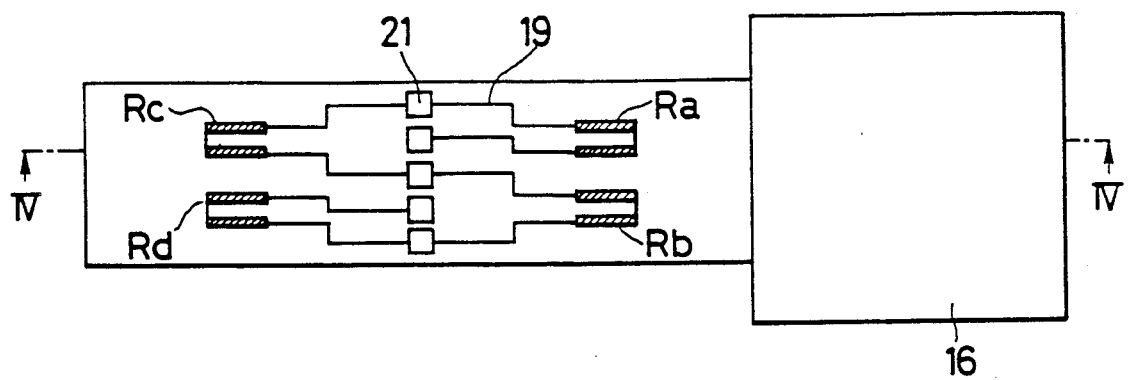
FIG. 3 is a top view of a first embodiment of a semiconductor acceleration sensor according to the present invention.

Pairs of piezoresistors Ra and Rb for detecting acceleration and piezoresistors Rc and Rd for compensating temperature as strain sensor devices are formed in the symmetrical positions with respect to the mounting portion 11 in the surface areas of the first and second cantilevered beams 13 and 14, respectively, as shown in FIG. 3. The protecting film 18 covers the surface of the semiconductor substrate 20 including the piezoresistors Ra, Rb, Rc and Rd. The piezoresistors Ra, Rb, Rc and Rd are coupled by aluminum wirings 19 formed on the protecting film 18 to constitute a bridge circuit, as clearly shown in FIG. 5, and the aluminum wirings 19 are connected to electrodes 21 composed of an aluminum film for linking the bridge circuit to an external device. The sensor chip described above is mounted to a base 23 at the bottom of the mount portion 11 via another adhesive layer 22 applied therebetween. The base 23 may be preferably composed of a material such as silicon or another material having approximately the same heat expansion coefficient as that of silicon.

The operation of the semiconductor acceleration sensor described above will now be described in detail.

Figure 5:
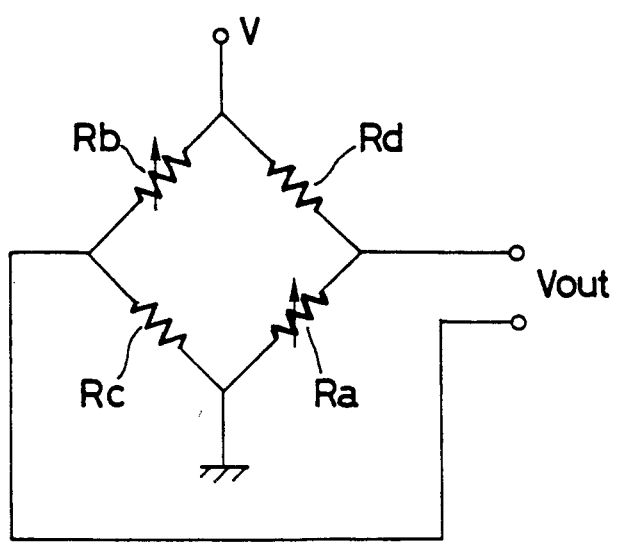
FIG. 5 is a circuit diagram of a bridge circuit having piezoresistors shown in FIG. 3.

When an acceleration is provided for the first weight including 13 and 16 in the direction perpendicular to the surfaces thereof, the first cantilevered beam 12 is bent, and a bending stress is applied to the piezoresistors Ra and Rb formed in its surface portion for acceleration sensing. Thus, the resistances of the piezoresistors Ra and Rb for acceleration sensing are varied depending on the acceleration provided. In turn, acceleration provided for is hardly the second weight 15, and a bending stress is hardly applied to the piezoresistors Rc and Rd formed in the surface portion of the second cantilevered beam 14. Hence, the resistances of the piezoresistors Rc and Rd for temperature compensation are hardly changed. Now, assuming that the resistance variation of the piezoresistors Ra and Rb for acceleration sensing with respect to the applied acceleration is ΔR and the initial resistance of each of the piezoresistors Ra, Rb, Rc and Rd is R, the output voltage Vout of the bridge circuit shown in FIG. 5 is obtained by the following formula, $$Vout = (\tfrac{1}{2}) \cdot (\Delta R/R) \cdot V \tag{2}$$

wherein V is the voltage applied to the bridge circuit.

In this embodiment, the following effects and advantages are obtained.

First, the effect of the thermal stress caused by the difference of the thermal expansion coefficient between the silicon and the protecting film 18 such as SiO$_2$ formed on the surface of the silicon substrate 20 is described. That is, generally, thermal stress of this kind varies depending on the surface position of the silicon substrate. Hence, when an arrangement of piezoresistors constituting a bridge circuit is different, the piezoresistors receive different thermal stresses, thereby causing offset temperature characteristics. In this embodiment, however, the first and second cantilevered beams 12 and 14 having the same thickness and width are symmetrically formed on the opposite sides of the mounting portion 11, and the two pairs of piezoresistors Ra and Rb, and Rc and Rd are formed in the same layout in the surface portions of the first and second cantilevered beams 12 and 14. Hence, each pair of piezoresistors Ra and Rb or Rc and Rd receives an equal thermal stress to improve the offset temperature characteristics.

In this embodiment, as compared with the conventional acceleration sensor shown in FIG. 1, the first and second cantilevered beams 12 and 14 are arranged in almost perfectly 180° symmetrical positions with respect to the mounting portion 11 as the center except for the first and second weights, with the result of improved symmetricity. Hence, the equality of the thermal stress given to each pair of piezoresistors Ra and Rb or Rc and Rd is largely improved, and the deterioration of the offset temperature characteristics due to the thermal stress caused by the difference of the thermal expansion coefficient between the silicon and the protecting film 18 is remarkably improved.

Secondly, the effect of the thermal stress caused by the difference of the thermal expansion coefficient among the silicon, the base, the package and the adhesive for use in sticking the sensor chip to the base or the package is described. In this case, the improved symmetry of the above described sensor chip structure causes improved results. That is, since the first and second cantilevered beams 12 and 14 having the same shape and dimension are symmetrically positioned on opposite sides with respect to the mounting portion 11 and the base 23 as the center, the thermal stresses caused in the symmetrical positions of the first and second cantilevered beams 12 and 14 become equal when acceleration is provided for the sensor chip. Therefore, reduction of the offset temperature characteristics due to thermal stress of this kind can be precisely prevented.

Next, one embodiment of a process for producing the above described sensor chip will be described in detail in connection with FIG. 6.

Figure 6A:
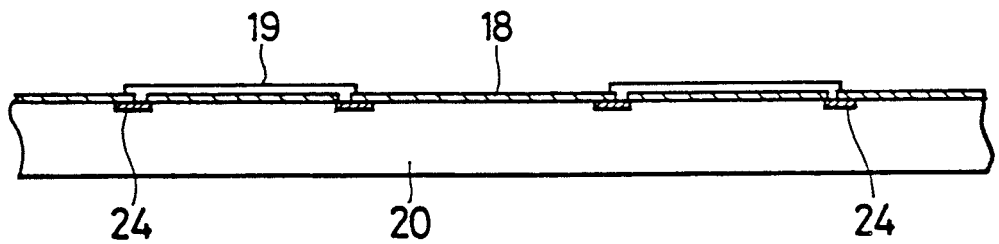
FIG. 6A, 6B and 6C are longitudinal cross sections schematically showing stages in the producing process for the acceleration sensor shown in FIG. 3.

As shown in FIG. 6A, P-type impurity diffusion regions 24 for the piezoresistors Ra, Rb, Rc and Rd are formed in the surface area of the semiconductor silicon substrate 20 having an N-type (100) surface. In this impurity doping process, a $SiO_2$ film having several thousands Å as the surface protecting film 18 is formed on the surface of the silicon substrate 20 by thermal oxidation. Then, by using the photoetching technique, contact holes are opened in the protecting film 18, and then the impurity diffusion regions 24 are connected by the aluminum wirings 19 formed on the protecting film 18 to obtain the bridge circuit shown in FIG. 5.

Figure 6B:
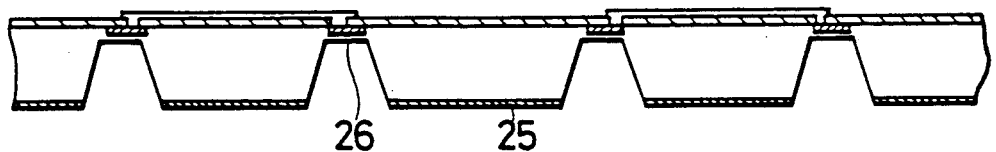

In FIG. 6B, a resist mask 25 of $SiO_2$, $Si_3N_4$ or the like having a predetermined pattern is formed on the back surface of the silicon substrate 20, and then the silicon substrate 20 is treated at the back surface, for example, from 200μm to approximately 50μm thickness by etching using a strong acidic or alkaline etching solution to form thin portions 26 for constituting the cantilevered beams.

Figure 6C:
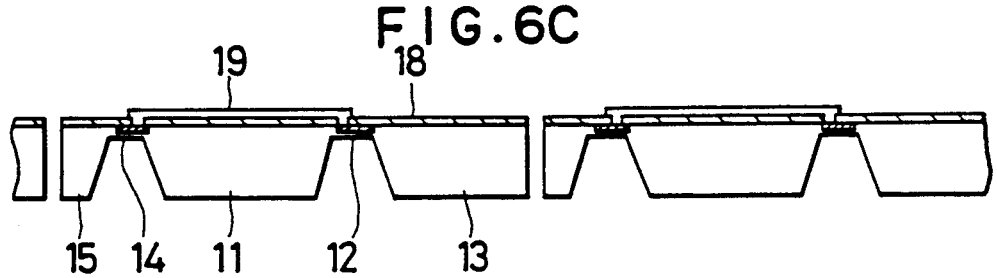

In FIG. 6C, the resulting substrate 20 is cut at the appropriate portions by using a dicing saw or the like to obtain a sensor chip including a mounting portion 11, first and second cantilevered beams 12 and 14 for acceleration sensing and temperature compensation, respectively, silicon weights 13 and 15, piezoresistors Ra, Rb, Rc and Rd, a protecting film 18 and wirings 19.

As described above, in this embodiment, since the first and second cantilevered beams 12 and 14 having the same shape and dimension are symmetrically formed on the opposite sides of the mounting portion 11 as the center, the back surface of the silicon substrate 20 is etched in the predetermined portions to form the thin portions 26 for the cantilevered beams, and then the resulting substrate 20 is cut at the proper portions in a wafer dicing process to obtain the sensor chips. It is readily understood that semiconductor acceleration sensors having improved offset temperature characteristics and having no stress concentrated area and thus a large destruction resistance structure can be produced in a simple process, and the producing cost and the dispersion of the characteristics of the sensors obtained in a mass production can be largely reduced.

Figure 4:
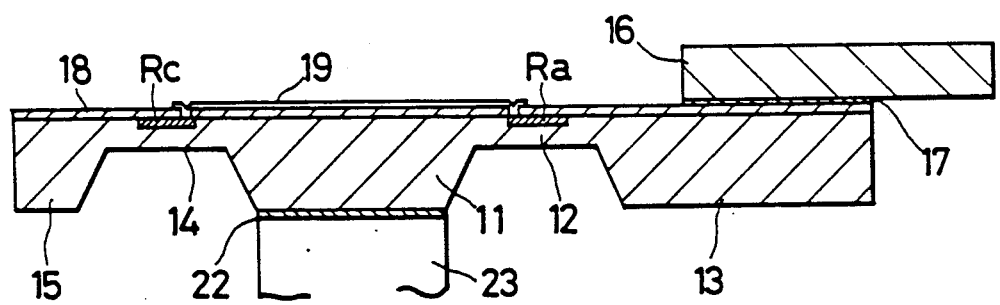
FIG. 4 is a longitudinal cross section, taken along the line IV—IV in FIG. 3.
Figure 7:
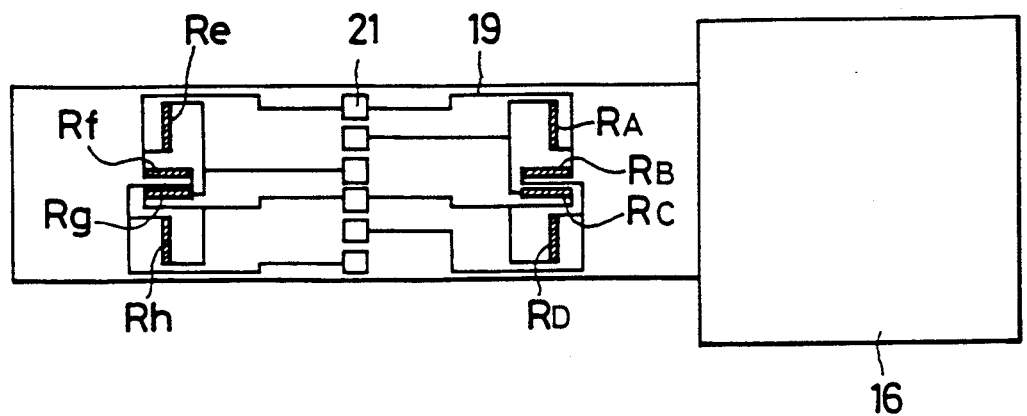
FIG. 7 is a top view of a second embodiment of a semiconductor acceleration sensor according to the present invention.
Figure 8:
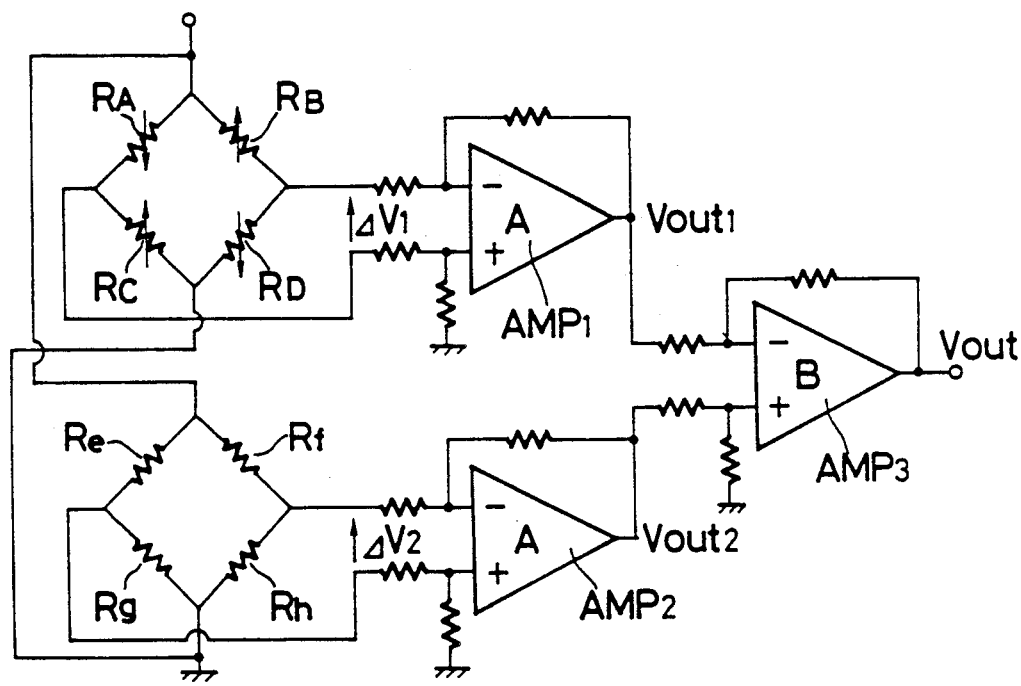
FIG. 8 is a circuit diagram of a processing circuit including bridge circuits having the piezoresistors shown in FIG. 7.

In FIGS. 7 and 8, there is shown a second embodiment of a semiconductor acceleration sensor according to the present invention, having the same structure as the first embodiment shown in FIGS. 3 to 5, except for the number and layout of piezoresistors.

In this embodiment, four piezoresistors $R_A$, $R_B$, $R_C$ and $R_D$ for acceleration sensing and four piezoresistors Re, Rf, Rg and Rh for temperature compensation are formed in the surface portions of the first and second cantilevered beams 12 and 14, respectively, in the same manner as described above, to prepare a processing circuit including two bridge circuits composed of the piezoresistors, as shown in FIG. 8.

In FIG. 8, the processing circuit includes first and second bridge circuits for acceleration sensing and temperature compensation three amplifiers AMP1, AMP2 and AMP3, and other resistors. In this embodiment, the effects for making the thermal stresses applied to the piezoresistors equal are the same as the first embodiment described above. A voltage variation $\Delta V1$ output from the first bridge circuit composed of the piezoresistors $R_A$, $R_B$, $R_C$ and $R_D$ for acceleration sensing is fed to AMP1 which amplifies it the A times to output a voltage Vout1 to the AMP3, and another voltage variation $\Delta V2$ output from the second bridge circuit composed of the piezoresistors Re, Rf, Rg and Rh is sent to AMP2 which amplifies it A times to output a voltage Vout2 to AMP3. In AMP3 having an amplification of B, the output voltages Vout1 and Vout2 of AMP1 AMP2 are differentially amplified with an amplification of B to output a voltage Vout when the temperature is varied. The output voltage Vout of the processing circuit shown in FIG. 8 is obtained in accordance with the following formula:

$$Vout = B \cdot (Vout2 - Vout1) \qquad (3)$$
$$= A \cdot B \cdot (\Delta V2 - \Delta V1)$$

Hence, since the voltage variations $\Delta V2$ and $\Delta V1$ indicate the same value during the temperature change, the voltage variations $\Delta V2$ and $\Delta V1$ negate each other, and the offset variation of the Vout of the processing circuit becomes very small. In this case, the same effects and advantages as those of the first embodiment can be obtained. In this embodiment, the resistances of the four piezoresistors $R_A$, $R_B$, $R_C$ and $R_D$ for acceleration sensing are all changed when acceleration is provided, and thus better detecting sensitivity, as much as twice that of the first embodiment can be obtained.

Figure 9:
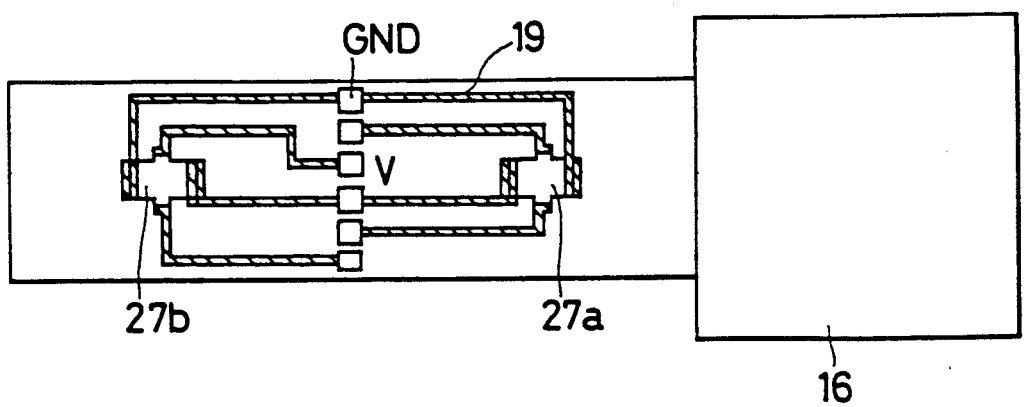
FIG. 9 is a top view of a third embodiment of a semiconductor acceleration sensor according to the present invention.

In FIG. 9, there is shown a third embodiment of a semiconductor acceleration sensor according to the present invention, having the same structure as the second embodiment, except that a pair of four-terminal gages 27a and 27b for acceleration sensing and temperature compensation is used as the strain sensing devices instead of the piezoresistors, and these are formed in the same layout in the surface portions of the first and second cantilevered beams. In this embodiment, the output voltages of the four-terminal gages 27a and 27b correspond to those of the first and second bridge circuits of the second embodiment and are operated in a similar manner to the second embodiment, with the result of the same results and advantages as those of the second embodiment.

According to the present invention, piezoelectric devices, pressure sensing diodes, pressure sensing transistors may be, of course, used as the strain sensing devices. The layouts of the strain sensing devices such as the piezoresistors and four-terminal gages are not restricted to the embodiments described above in connection with the accompanying drawings, and other layouts where the strain sensing devices are symmetrically arranged on the opposite sides of the mounting portion as the center, may be used. The weights formed at the ends of the cantilevered beams are not restricted to the silicon weights, and other materials can be used for the weights. The second weight formed at the end of the cantilevered beam for temperature compensation can be omitted, resulting in improved effects for the offset temperature characteristics which are almost the same as in the embodiment providing the second weight at the end of the cantilevered beam for temperature compensation.

What is claimed is:

1. A semiconductor acceleration sensor, comprising:
a semiconductor substrate;
a mounting portion formed in said substrate;
a first cantilevered beam for acceleration detection;
a second cantilevered beam for temperature compensation;
said first beam and said second beam formed in said substrate on opposite sides of said mounting portion, respectively, so that said first beam, said mounting portion and said second beam are aligned in order along a straight line;
a first weight formed at an end of said first beam;
first strain sensing means for said acceleration detection; and
second strain sensing means for said temperature compensation;
said first and second strain sensing means formed in approximately the same layout in surface portions of said first and second beams, respectively.

2. The sensor of claim 1, wherein:
said first strain sensing means comprises a first group of strain sensing devices for said acceleration detection; and
said second strain sensing means comprises a second group of strain sensing devices for said temperature compensation.

3. The sensor of claim 2, also including:
a second weight having a mass which is small relative to said first weight and formed at an end of said second beam.

4. The sensor of claim 2, wherein:
said strain sensing devices of said first and second groups are piezoresistors constituting a bridge.

5. The sensor of claim 2, wherein:
said strain sensing devices of said first and second groups are piezoresistors and constitute a first bridge and a second bridge, respectively.

6. The sensor of claim 5, also including:
a first amplifier amplifying an output of said first bridge by a given amplification factor;
a second amplifier amplifying an output of said second bridge by said given amplification factor; and
a third amplifier differentially amplifying respective outputs of said first and second amplifiers by another amplification factor.

7. The sensor of claim 2, wherein:
said first weight comprises an upper weight member attached to a lower weight member by an adhesive layer.

8. The sensor of claim 2, wherein:
a protecting film is formed on a surface of said substrate.

9. The sensor of claim 8, wherein:
said strain sensing devices are connected by wiring formed on said protecting film on said substrate.

10. The sensor of claim 2, wherein:
said mounting portion is connected to a base by an adhesive layer.

11. The sensor of claim 1, wherein:
said first and second strain sensing means are a first four-terminal gage and a second four-terminal gage, respectively.

12. The sensor of claim 11, also including:
a first amplifier amplifying an output of said first gage by a given amplification factor;
a second amplifier amplifying an output of said second gage by said given amplification factor; and
a third amplifier differentially amplifying respective outputs of said first and second amplifiers by another amplification factor.

* * * * *